(12) United States Patent
Lubischer et al.

(10) Patent No.: US 9,828,016 B2
(45) Date of Patent: Nov. 28, 2017

(54) RETRACTABLE STEERING COLUMN SYSTEM, VEHICLE HAVING THE SAME, AND METHOD

(71) Applicant: STEERING SOLUTIONS IP HOLDING CORPORATION, Saginaw, MI (US)

(72) Inventors: Frank P. Lubischer, Commerce Township, MI (US); Richard K. Riefe, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/178,740

(22) Filed: Jun. 10, 2016

(65) Prior Publication Data

US 2016/0375860 A1 Dec. 29, 2016

Related U.S. Application Data (60) Provisional application No. 62/183,963, filed on Jun. 24, 2015.

(51) Int. Cl.
*B62D 1/183* (2006.01)
*B60R 21/203* (2006.01)
*B60R 21/16* (2006.01)

(52) U.S. Cl.
CPC .......... *B62D 1/183* (2013.01); *B60R 21/203* (2013.01); *B60R 2021/162* (2013.01)

(58) Field of Classification Search
CPC ........ B62D 1/183; B62D 1/181; B60R 21/203
See application file for complete search history.

(56) References Cited

U.S. PATENT DOCUMENTS 3,782,492 A * 1/1974 Hollins ................... B60R 21/02
  180/271
4,315,117 A    2/1982 Kokubo et al.
4,337,967 A    7/1982 Yoshida et al.
(Continued)

FOREIGN PATENT DOCUMENTS

CN   1722030   1/2006
CN   1736786   2/2006
(Continued)

OTHER PUBLICATIONS

China Patent Application No. 201510204221.5 Second Office Action dated Mar. 10, 2017, 8 pages.
(Continued)

*Primary Examiner* — Faye M Fleming
(74) *Attorney, Agent, or Firm* — Cantor Colburn LLP (57) ABSTRACT

A steering column system includes a steering column shaft, a steering input device coupled to the steering column shaft, an air bag operatively arranged with the steering input device, a column adjustment assembly configured to translate the steering column shaft between a retracted position and a driving position, and a first interlock configured to indicate when the steering column shaft is in the driving position and when the steering column shaft is in the retracted position. When the steering column shaft is in the retracted position, the air bag is non-deployable, and when the steering column shaft is in the driving position, the air bag is deployable.

19 Claims, 6 Drawing Sheets

(56) References Cited

U.S. PATENT DOCUMENTS

| | | |
|---|---|---|
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 4,976,239 A | 12/1990 | Hosaka |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari et al. |
| 5,618,058 A | 4/1997 | Byon |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,170,862 B1 | 1/2001 | Hoagland et al. |
| 6,227,571 B1 | 5/2001 | Sheng et al. |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,578,449 B1 | 6/2003 | Anspaugh et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Yamaguchi |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 2003/0046012 A1 | 3/2003 | Yamaguchi |
| 2003/0094330 A1 | 5/2003 | Boloorchi et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1* | 3/2004 | Riefe .................... B62D 1/181 280/777 |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0275205 A1 | 12/2005 | Ahnafield |
| 2006/0186658 A1 | 8/2006 | Yasuhara et al. |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1* | 3/2007 | Bito .................... B60R 21/203 280/777 |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |

(56) References Cited

U.S. PATENT DOCUMENTS

| | | | |
|---|---|---|---|
| 2013/0002416 A1* | 1/2013 | Gazit | B62D 1/28 340/438 |
| 2013/0087006 A1 | 4/2013 | Ohtsubo et al. | |
| 2013/0158771 A1 | 6/2013 | Kaufmann | |
| 2013/0199866 A1 | 8/2013 | Yamamoto et al. | |
| 2013/0218396 A1 | 8/2013 | Moshchuk et al. | |
| 2013/0233117 A1 | 9/2013 | Read et al. | |
| 2013/0325202 A1 | 12/2013 | Howard et al. | |
| 2014/0028008 A1* | 1/2014 | Stadler | B62D 1/192 280/777 |
| 2014/0046542 A1 | 2/2014 | Kauffman et al. | |
| 2014/0046547 A1 | 2/2014 | Kaufmann et al. | |
| 2014/0111324 A1 | 4/2014 | Lisseman et al. | |
| 2014/0277896 A1* | 9/2014 | Lathrop | B62D 1/04 701/23 |
| 2014/0300479 A1 | 10/2014 | Wolter et al. | |
| 2014/0309816 A1 | 10/2014 | Stefan et al. | |
| 2015/0002404 A1 | 1/2015 | Hooton | |
| 2015/0014086 A1 | 1/2015 | Eisenbarth | |
| 2015/0032322 A1 | 1/2015 | Wimmer | |
| 2015/0051780 A1 | 2/2015 | Hahne | |
| 2015/0060185 A1 | 3/2015 | Feguri | |
| 2015/0120142 A1 | 4/2015 | Park et al. | |
| 2015/0137492 A1 | 5/2015 | Rao et al. | |
| 2015/0203145 A1 | 7/2015 | Sugiura et al. | |
| 2015/0210273 A1 | 7/2015 | Kaufmann et al. | |
| 2015/0246673 A1 | 9/2015 | Tseng et al. | |
| 2015/0251666 A1 | 9/2015 | Attard et al. | |
| 2015/0283998 A1 | 10/2015 | Lind et al. | |
| 2015/0324111 A1 | 11/2015 | Jubner et al. | |
| 2016/0009332 A1 | 1/2016 | Sirbu | |
| 2016/0075371 A1 | 3/2016 | Varunkikar et al. | |
| 2016/0082867 A1 | 3/2016 | Sugioka et al. | |
| 2016/0185387 A1 | 6/2016 | Kuoch | |
| 2016/0200246 A1 | 7/2016 | Lisseman et al. | |
| 2016/0200343 A1 | 7/2016 | Lisseman et al. | |
| 2016/0200344 A1 | 7/2016 | Sugioka et al. | |
| 2016/0207538 A1 | 7/2016 | Urano et al. | |
| 2016/0209841 A1 | 7/2016 | Yamaoka et al. | |
| 2016/0229450 A1 | 8/2016 | Basting et al. | |
| 2016/0231743 A1 | 8/2016 | Bendewald et al. | |
| 2016/0244070 A1* | 8/2016 | Bendewald | B60W 50/08 |
| 2016/0318540 A1 | 11/2016 | King | |
| 2016/0318542 A1 | 11/2016 | Pattok et al. | |
| 2016/0347347 A1 | 12/2016 | Lubischer et al. | |
| 2016/0347348 A1* | 12/2016 | Lubischer | B62D 1/181 |
| 2016/0362084 A1 | 12/2016 | Martin et al. | |
| 2016/0362117 A1 | 12/2016 | Kaufmann et al. | |
| 2016/0362126 A1* | 12/2016 | Lubischer | B62D 1/183 |
| 2016/0368522 A1* | 12/2016 | Lubischer | B62D 1/181 |
| 2016/0375770 A1 | 12/2016 | Ryne et al. | |
| 2016/0375860 A1 | 12/2016 | Lubischer | |
| 2016/0375923 A1 | 12/2016 | Schulz | |
| 2016/0375924 A1 | 12/2016 | Bodtker et al. | |
| 2016/0375925 A1 | 12/2016 | Lubischer et al. | |
| 2016/0375926 A1 | 12/2016 | Lubischer et al. | |
| 2016/0375927 A1* | 12/2016 | Schulz | B62D 1/183 280/775 |
| 2016/0375928 A1* | 12/2016 | Magnus | F16H 25/2204 74/493 |
| 2016/0375929 A1 | 12/2016 | Rouleau | |
| 2016/0375931 A1 | 12/2016 | Lubischer et al. | |
| 2017/0029009 A1 | 2/2017 | Rouleau | |
| 2017/0029018 A1 | 2/2017 | Lubischer | |
| 2017/0113589 A1* | 4/2017 | Riefe | B60N 3/005 |
| 2017/0113712 A1 | 4/2017 | Watz | |

FOREIGN PATENT DOCUMENTS

| | | |
|---|---|---|
| CN | 101037117 | 9/2007 |
| CN | 101041355 | 9/2007 |
| CN | 101596903 | 12/2009 |
| CN | 102452391 | 5/2012 |
| CN | 103419840 | 12/2013 |
| DE | 19923012 | 11/2000 |
| DE | 10212782 A1 | 10/2003 |
| DE | 102005032528 | 1/2007 |
| DE | 102005056438 A1 | 6/2007 |
| DE | 102006025254 | 12/2007 |
| DE | 1020081057313 A3 | 10/2009 |
| DE | 102010025197 A1 | 12/2011 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | H05162652 | 6/1993 |
| KR | 20100063433 A | 6/2010 |
| WO | 2006099483 A1 | 9/2006 |
| WO | 2010082394 A1 | 7/2010 |
| WO | 2010116518 | 10/2010 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
Van der Jagt, Pim; "Prediction of Steering Efforts During Stationary or Slow Rolling Parking Maneuvers"; Ford Forschungszentrum Aachen GmbH.; Oct. 27, 1999; 20 pages.

* cited by examiner

RETRACTABLE STEERING COLUMN SYSTEM, VEHICLE HAVING THE SAME, AND METHOD

CROSS-REFERENCES TO RELATED APPLICATIONS

This patent application claims priority to U.S. Provisional Patent Application Ser. No. 62/183,963, filed Jun. 24, 2015 which is incorporated herein by reference in its entirety.

FIELD OF THE INVENTION

The following description relates to steering column assemblies and, more specifically, to a retractable steering column assembly.

BACKGROUND

Vehicle steering wheels are typically used to steer a vehicle. When a vehicle is equipped with an autonomous driving assist systems ("ADAS"), the steering wheel does not need to rotate as the self-driving system turns the road wheels. This non-rotation allows the steering column and wheel to have another use or purpose.

Accordingly, it is desirable to provide a steering column assembly that enables the driver to manipulate the position or purpose of the steering wheel while still providing driver protection.

SUMMARY OF THE INVENTION

In one embodiment of the present disclosure, a steering column system includes a steering column shaft, a steering input device coupled to the steering column shaft, an air bag operatively arranged with the steering input device, a column adjustment assembly configured to translate the steering column shaft between a retracted position and a driving position, and a first interlock configured to indicate when the steering column shaft is in the driving position and when the steering column shaft is in the retracted position. When the steering column shaft is in the retracted position, the air bag is non-deployable, and when the steering column shaft is in the driving position, the air bag is deployable.

In another embodiment of the present disclosure, a steering column system includes a steering column shaft, a steering input device coupled to the steering column shaft, a driver restraint, a column adjustment assembly configured to translate the steering column shaft between a retracted position and a driving position, and a first interlock configured to indicate whether the driver restraint is locked. When the driver restraint is locked, the steering column shaft is retractable, and when the driver restraint is not locked, the steering column shaft is not retractable.

In still another embodiment of the present disclosure, a vehicle includes a steering column system. The steering column system includes a steering column shaft, a steering input device coupled to the steering column shaft, an air bag operatively arranged with the steering input device, a driver restraint, a column adjustment assembly configured to translate the steering column shaft between a retracted position and a driving position, and at least one of a first interlock and a second interlock, the first interlock configured to indicate whether the driver restraint is locked, the second interlock configured to indicate when the steering column shaft is in the driving position and when the steering column shaft is in the retracted position. When the steering column shaft is in the retracted position, the air bag is non-deployable, and when the steering column shaft is in the driving position, the air bag is deployable. When the driver restraint is locked, the steering column shaft is retractable, and when the driver restraint is not locked, the steering column shaft is not retractable.

In yet another embodiment of the present invention, a method of operating a steering column system of a vehicle includes providing a steering column shaft movable between a retracted position and a driving position, moving a driver restraint to one of a locked position and an unlocked position, and, translating a steering column shaft to the retracted position when the driver restraint is in the locked position, and prohibiting the steering column shaft from being in the retracted position when the driver restraint is in the unlocked position.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
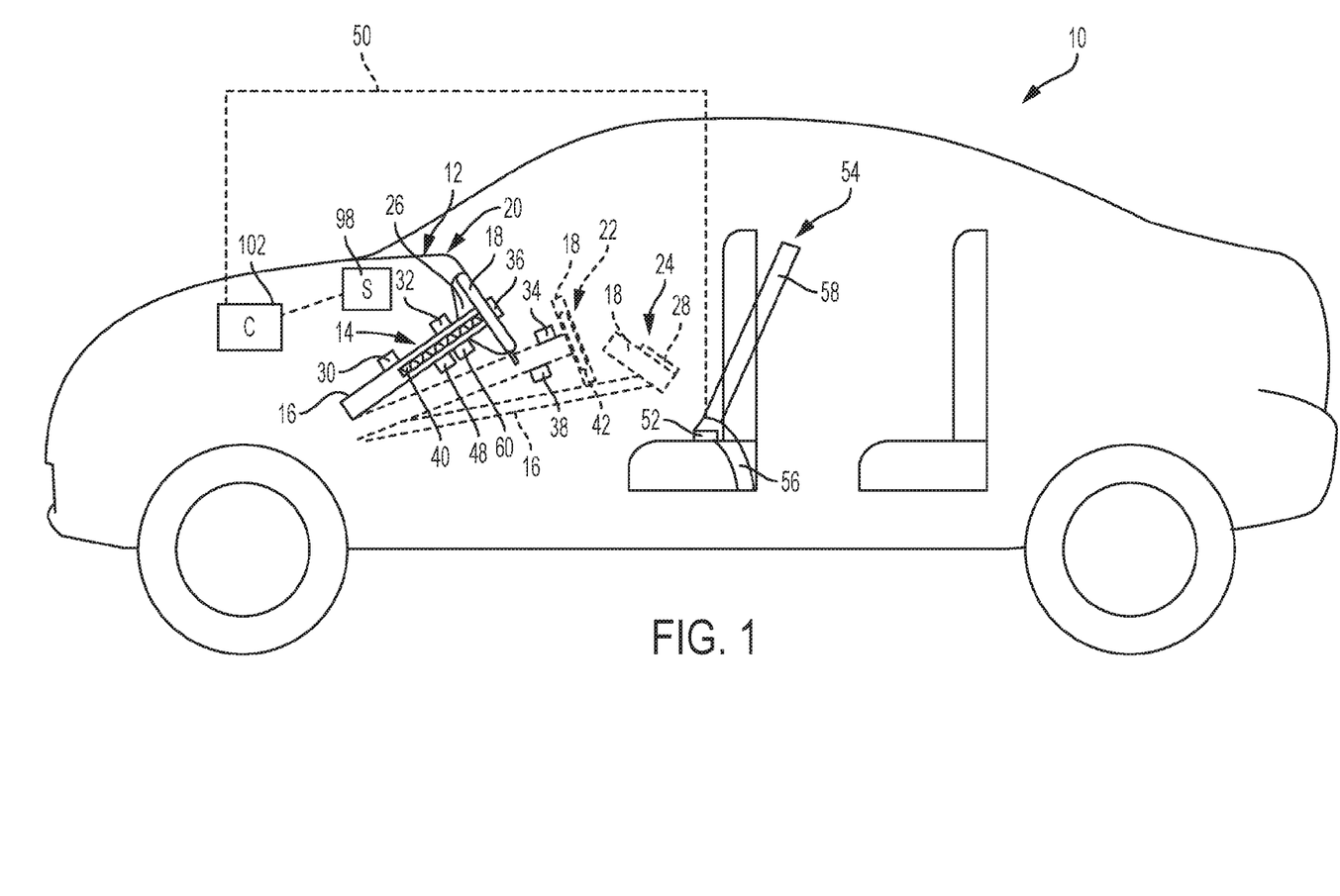
FIG. 1 is a schematic view of a vehicle and steering column assembly according to one embodiment of the disclosure.

Referring now to the Figures, where embodiments will be described, without limiting same, FIG. 1 illustrates an embodiment of a vehicle 10, such as an autonomous driving assisted steering ("ADAS") equipped vehicle, generally having an instrument panel 12 and a retractable steering column assembly 14. Steering column assembly 14 generally includes a steering column shaft 16 and a steering input device, such as steering wheel 18, coupled thereto.

In the exemplary embodiment, steering column assembly 14 is movable between a retracted position 20, a deployed or driving position 22, and an accessory or utility position 24. In the retracted position 20, portions of assembly 14 such as steering wheel 18 are disposed away from the driver toward or into instrument panel 12, which provides increased space for the driver. In the illustrated embodiment, instrument panel 12 includes one or more receiving compartments or areas 26 to receive some or all of steering column assembly 14. For example, receiving area 26 may be configured to receive steering wheel 18 such that wheel 18 and thus assembly 14 may be retracted within and flush with instrument panel 12. The displacement of the steering column shaft 16 and wheel 18 in retracted position 20 creates additional cabin space for the driver's comfort and convenience to perform non-driving activities including, but not limited to, reading, working, entertaining, eating, texting, etc.

Figure 2:
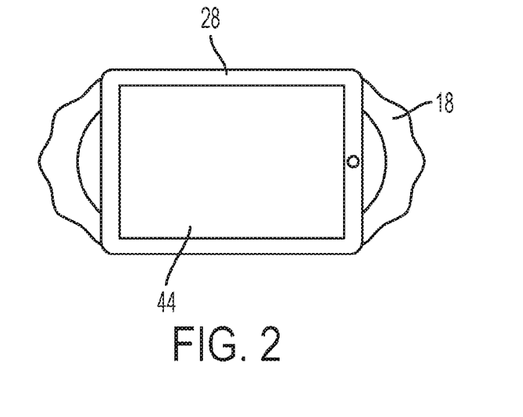
FIG. 2 is a plan view of an embodiment of a steering wheel for use in the vehicle of FIG. 1 when the steering column assembly of FIG. 1 is in an accessory/utility position.

In the driving position 22, steering wheel 18 may be used by a driver to steer the vehicle 10. The steering wheel 18 is positioned closer to the driver 46 (FIG. 3) in the driving position 22 than in the retracted position 20. Also, the steering wheel 18 is distanced further from the instrument panel 12 in the driving position 22 than in the retracted position 20. While only one driving position 22 is shown, a plurality of driving positions 22 may be utilized to comfortably accommodate different drivers 46. In the accessory position 24, portions of assembly 14 such as steering wheel 18 may be used for non-driving activities such as reading, working, or other forms of entertainment. As such, at least a portion of steering wheel 18 is configured to be non-rotatable such that objects like computers or books may be rested thereupon. For example, a tray table or work surface 28 may be coupled to or integrated with steering wheel 18 to enable such activities, as further depicted in FIG. 2. Alternatively, only a rim or hub of the steering wheel 18 is non-rotatable and includes attachments such as hooks to support work surface 28. In other embodiments, an electronic device or the like, such as but not limited to a tablet 44, is integrated into the stationary wheel 18 or work surface 28.

In one embodiment, steering column assembly 14 further includes a steering column adjustment assembly 30, a decoupling assembly 32, a torque interface assembly 34, one or more sensors 36, reversible lock 38, and extension detection device 48. Each of assemblies 30, 32, 34, sensors 36, lock 38, and device 48 are associated with the steering column assembly 14 in each position 20, 22, 24, however, for clarity, one or more of the assemblies 30, 32, 34, sensors 36, lock 38, and device 48 are not depicted in each position 20, 22, 24. Further, any two or more of the assemblies 30, 32, 34, sensors 36, lock 38, and device 48 may be combined into a single system for use with the steering column assembly 14. Adjustment assembly 30 is configured to move steering column assembly 14 for driver comfort (e.g., telescope or rake adjustment) and to move assembly 14 between the retracted position 20 and the driving position 22. Adjustment assembly 30 may include one or more mechanical/electrical mechanisms such as a motor. Adjustment assembly 30 may also include a retraction mechanism that enables a driver to mechanically, electronically, or manually return steering wheel 18 from the retracted position 20 to the driving position 22. The adjustment assembly 30 includes electrical actuators that may move the steering column shaft 16 and steering wheel 18 fore and aft. While depicted separately, the extension detection device 48 may alternatively be incorporated into the adjustment assembly 30.

In one embodiment, decoupling assembly 32 is configured to selectively decouple one or more portions of assembly 14 (e.g., shaft 16) from a vehicle steering gear 31 (shown schematically in FIG. 3) such that steering wheel 18 is in a non-rotatable mode. This decoupling assembly 32 may be mechanically or electrically activatable by a clutch, or by steer-by-wire, or counter-rotated by a servo-actuator, for example. Alternatively or additionally, assembly 32 may provide a counter rotation to wheel 18 to counteract any rotation of wheel 18 caused by the autonomous driver assisted steering system such that wheel 18 functions and appears as non-rotatable.

Figure 3:
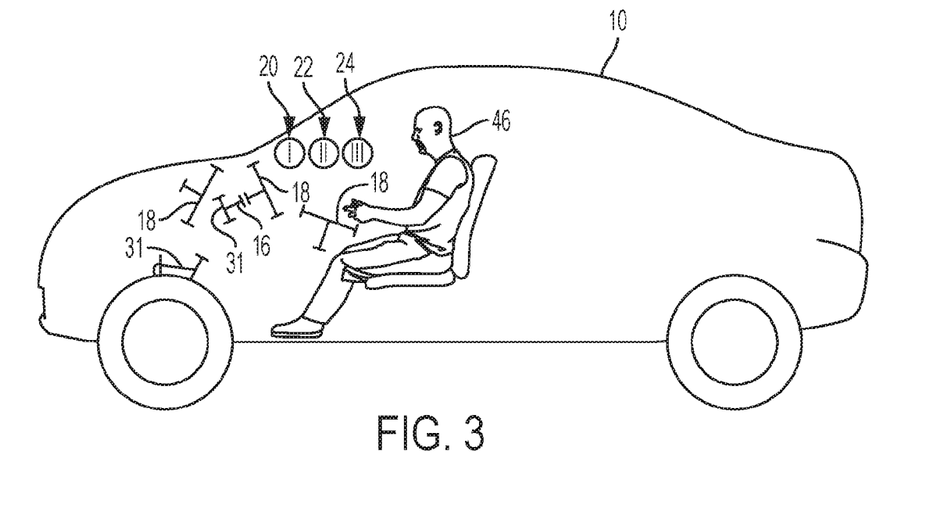
FIG. 3 is a schematic view of the vehicle of FIG. 1 further demonstrating different modes of the steering column assembly.

Further, the decoupling assembly 32 allows the steering column shaft 16 and wheel 18 to be displaced forward in the vehicle 10 to the retracted position 20 because the steering wheel 18 is no longer being used by the driver 46 to guide the vehicle 10. The retracting action may accomplished by, for example, long stroke, electrical actuators responding to the driver's intention through a switch and motor controller, or by the driver 46 manually releasing a clamp and pushing the steering wheel 18 and steering column shaft 16 forward to the retracted position 20. In any case, the embodiments described herein make retraction of the steering column shaft 16 and wheel 18 away from the driver possible in order to provide space for non-driving related activities such as working, reading, and game playing. In the retracted position 20, the steering wheel 18 is a preset distance beyond a normal ergonomic range from the driving position 22. The steering wheel 18 may, for example but not by limitation, be approximately 100 mm forward of the driver's normal driving position 22. The decoupling assembly 32 may also be used to re-couple one or more portions of assembly 14 (e.g., shaft 16) to the vehicle steering gear 31 when the shaft 16 and wheel 18 are in the driving position 22 such that the steering wheel 18 is usable by the driver 46 to guide the vehicle 10, however the decoupling assembly 32 decouples the one or more portions of assembly 14 (e.g., shaft 16) from the vehicle steering gear 31 when the shaft 16 and wheel 18 are in the retracted position 20 or utility position 24, such as shown in FIG. 3.

Figure 4:
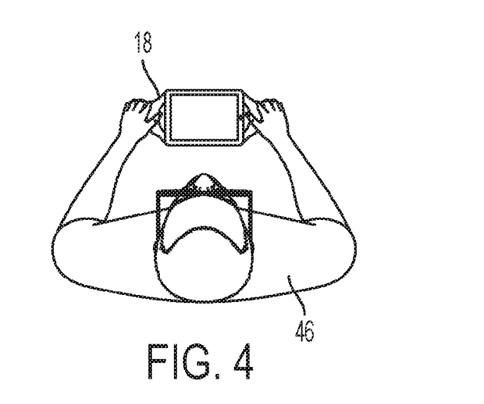
FIG. 4 is a schematic view of an operator engaging with an embodiment of the steering wheel for use with the vehicle of FIG. 1.

In one embodiment, torque interface assembly 34 is configured to detect and monitor driver torque input (rotational and translational) to steering wheel 18, for example, to determine if the driver 46 is in control of the vehicle 10, such as depicted by FIG. 4. As further shown in FIG. 1, sensors 36 are configured to detect and monitor driver compartment conditions, the driver's condition, the vehicle environment, and/or the vehicle control systems. For example, sensors 36 may: detect objects between the retracted steering wheel 18 and the driver 46 that may cause an unsafe situation for the driver 46 to safely retake control of the vehicle 10; detect if the driver 46 is not in a position to safely retake control of the vehicle 10; and/or detect undesirable vehicle dynamics that require the driver 46 to retake control of the vehicle 10. Whether in the retracted position 20, the deployed/driving position 22, or the accessory/utility position 24, the fore-aft position of the steering column shaft 16 and wheel 18 is known by the ADAS system 98 by detected data from one or more of the torque interface assembly 34, the sensors 36, and extension detection device 48, which may be positioned on the steering column shaft 16 or wheel 18. Sensors may include, but are not limited to switches and potentiometers.

The retracting process of moving the steering column shaft 16 and wheel 18 from the driving position 22 (or accessory/utility position 24) to the retracted position 20 must eventually be reversed to return steering control of the vehicle 10 to the driver 46. In the event that the driver 46 wishes to disengage the self-driving feature, the driver 46 may alert the ADAS system 98 of the desire to self-steer by gripping sensors on the wheel 18, applying steering torque to the wheel 18, or other sensory means that communicates the intention to take over driving the vehicle 10. That is, the driver 46 should be able to reach forward, grip the wheel 18, and be able to relatively quickly bring the wheel 18 to the driving position 22 to resume steering of the vehicle 10.

When returned to the driving position 22, the steering column 16 and steering wheel 18 are fixed, at least temporarily, such as by the decoupling assembly 32 and/or the deactivatable, reversible lock 38, in that fore-aft position of the driving position 20. When fixed in the driving position 20, the vehicle 10 provides the ability to reduce the driver's kinetic energy, such as may result from a crash, via an energy absorbing mechanism 40 in the steering column shaft 16, the deformation of the steering wheel 18, and the deployment of the driver's air bag 42. However, if the steering wheel 18 and the air bag 42 are distanced from the driver 46 in the retracted position 20, then the air bag 42 may not be ideally situated for driver protection in the event of a crash, and deployment of the air bag 42 during a crash may not be an effective injury reducing device. Thus, in accordance with embodiments of this disclosure, when the steering column shaft 16 and the steering wheel 18 are retracted away from the normal driving position 22, then provisions are put in place to ensure driver protection.

In one embodiment, as shown in FIG. 1 and further described below with respect to FIGS. 5A and 5B, an electrical interlock 50, shown schematically between a locking portion 52 of a driver restraint 54 and the controller 102, is provided that signals the controller 102 whether or not the driver restraint 54 is properly engaged with the locking portion 52, such as via an activating current or a deactivating current. The controller 102 controls the actuator of the steering column adjustment assembly 30, and prevents the retraction of the steering column shaft 16 and the wheel 18 towards the instrument panel 12 if the driver 46 has not first properly engaged the restraint 54. As illustrated, the restraint 54 may include a seat belt 56 and shoulder harness 58. In addition, if the restraint 54 becomes disconnected from the locking portion 52 while driving, the electrical interlock 50 will signal the controller 102 which can actuate the adjustment assembly 30 to move (motor) the steering wheel 18 and steering column shaft 16 back to the driving position 22. Visual and audible vehicle warnings may also accompany this action. Thus, although the driver's air bag 42 is positioned further from the driver 46 when the steering wheel 18 is in the retracted position 20, driver protection is improved by requiring the restraint 54 be engaged in the locking portion 52.

Figure 5A:
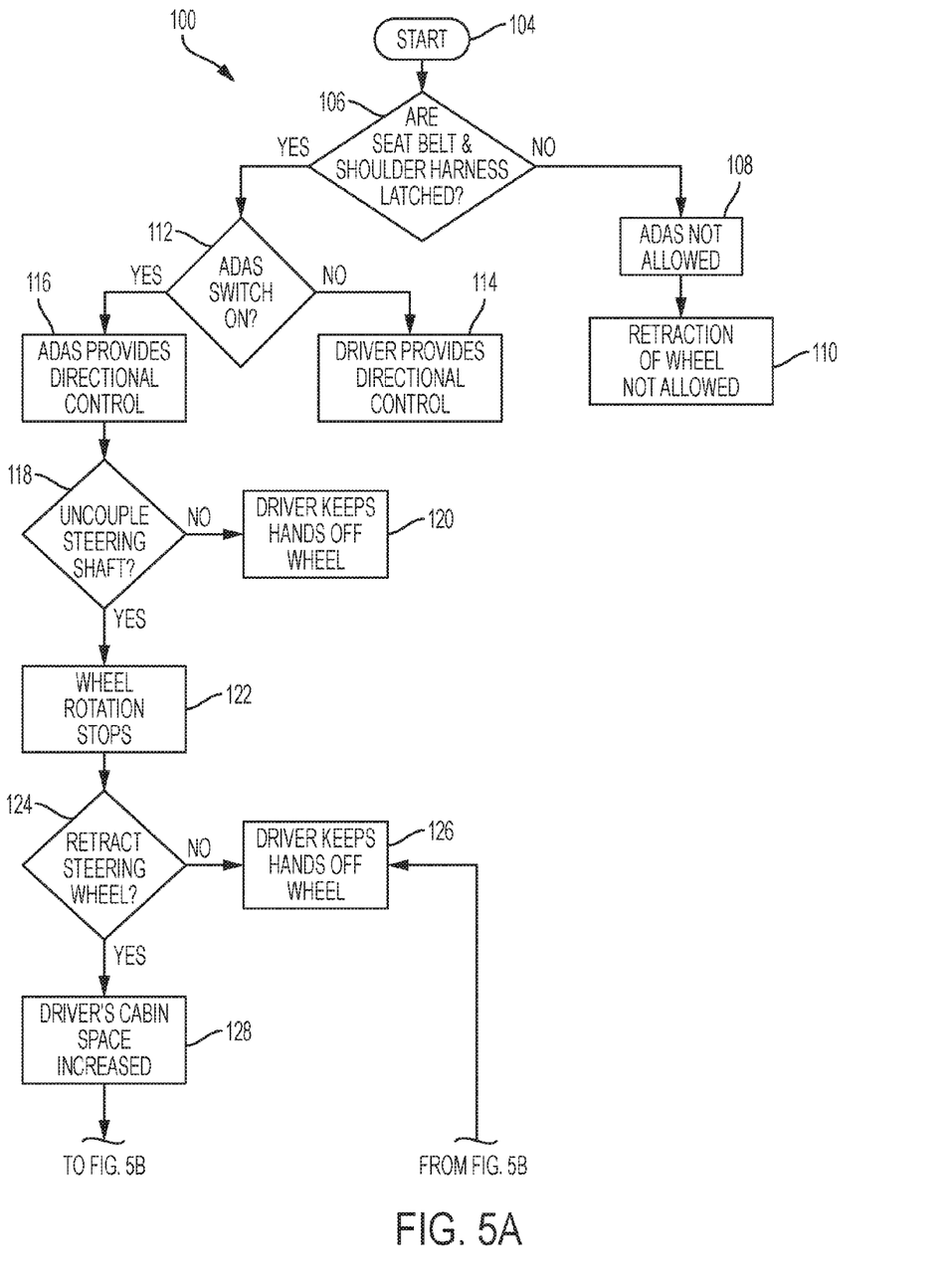
FIGS. 5A and 5B show a flowchart demonstrating an operation of the vehicle and steering column assembly according to one embodiment of the disclosure; and, FIGS. 6A and 6B show a flowchart demonstrating an operation of the vehicle and steering column assembly according to one embodiment of the disclosure.
Figure 5B:
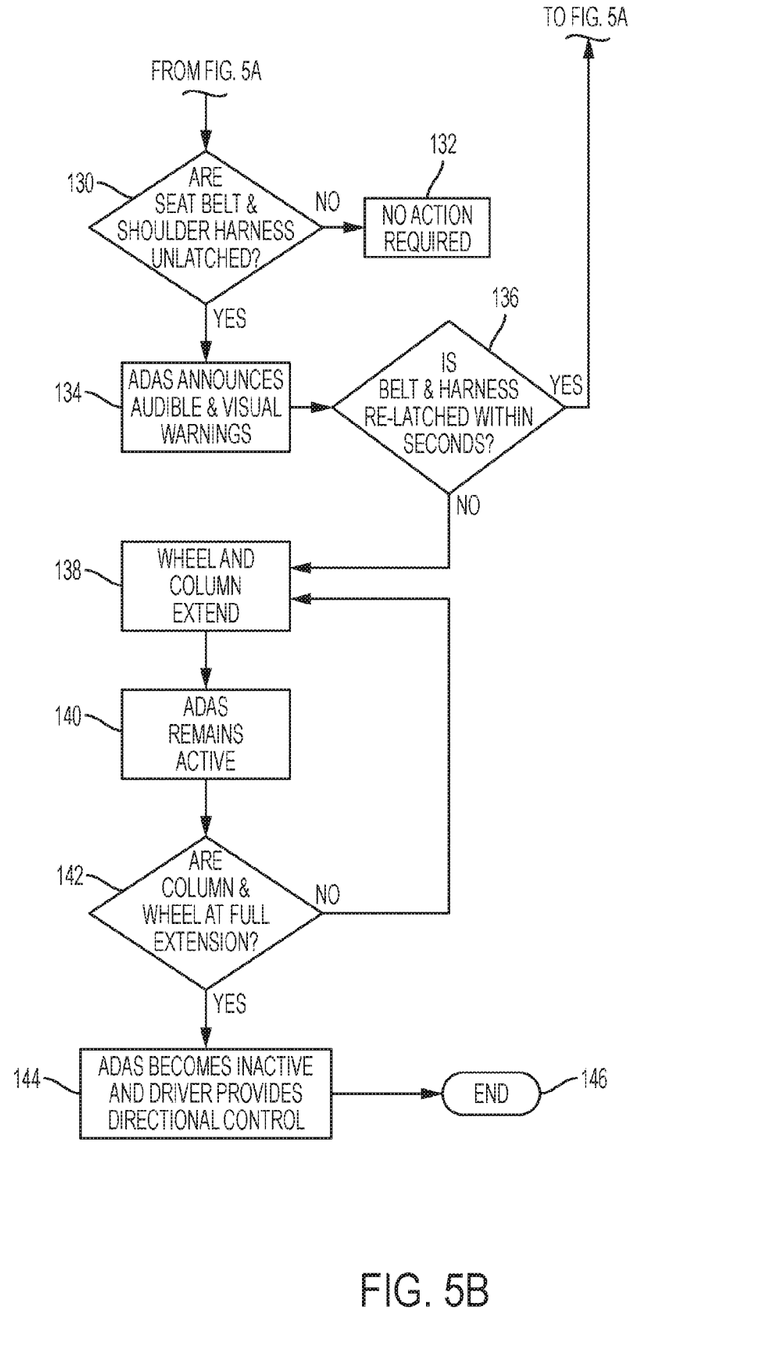

An operation 100 for the above-described system is described with respect to FIGS. 5A and 5B. A start 104 of the operation 100, as shown in FIG. 5A, may be assessed by a controller 102 of the ADAS system 98, shown diagrammatically in FIG. 1. The controller 102 may receive information (signal(s)) from, but not limited to, one or more of the steering column adjustment assembly 30, decoupling assembly 32, torque interface assembly 34, sensors 36, reversible lock 38, extension detection device 48, as well as any other feature within the vehicle 10 that is communicable with the controller 102. The operation 100 will determine, as demonstrated by block 106 whether the restraint 54 is latched, such as with locking portion 52. If not, then ADAS is not allowed as demonstrated by block 108, and further retraction of wheel 18 is not allowed as demonstrated by block 110. However, if it is determined at block 106 that the restraint 54 is latched, then it will be determined at block 112 whether an ADAS switch of the ADAS system 98 is on. When the ADAS switch is not on, then, as demonstrated by block 114, a driver 46 may provide directional control.

When the ADAS switch is on, then, as demonstrated by block 116, the ADAS system 98 may provide directional control. The controller 102 further determines, as demonstrated by block 118, if the steering column shaft 16 has been decoupled yet, such as by decoupling assembly 32. If not, then as demonstrated by block 120, the driver 46 keeps hands off the steering wheel 18. If the steering column shaft 16 is decoupled, then as demonstrated by block 122, rotation of steering wheel 18 is stopped.

At some point during the operation 100, a driver 46 may wish to retract the steering wheel 18 away from the driving position 22. The controller 102 will determine, such as via receipt of a signal, as demonstrated by block 124, if the column shaft 16 and wheel 18 are retracted during the retracting operation to position 20. If not, then as demonstrated by block 126, the driver 46 will keep hands off the steering wheel 18. However, if the steering column shaft 16 and wheel 18 are retracted, then as demonstrated by block 128, cabin space within the vehicle 10 is enlarged. At this point, the ADAS system 98 still provides directional control, as previously depicted at block 116.

The operation 100 extends from block 128 in FIG. 5A to block 130 in FIG. 5B. With reference now to block 130 in FIG. 5B, the operation 100 determines whether the restraint has become unlatched or not, such as by using interlock 50. If not, that is, if the restraint 50 is still latched, then no action is required as demonstrated by block 132. However, as demonstrated by block 134, if it is determined via the interlock 50 that the restraint 54 has become unlatched from the locking portion 52, then the ADAS system 98 may announce the unlatching such as by audible and visual warnings. If the restraint 54 becomes re-latched within a preset time period, such as within seconds, as determined by block 136, then the driver 46 may still keep hands off the wheel 18, as previously demonstrated by block 126 in FIG. 5A. However, if it is determined at block 136 that the restraint 54 has not been re-latched within the preset time period, then, as demonstrated by block 138, the wheel 18 and steering column shaft 16 extend towards the driver 46. The ADAS system 98 may remain active, as demonstrated by bock 140. It is determined at block 142, whether the steering column shaft 16 and steering wheel 18 are at full extension to the driving position 22. If not at full extension, the wheel 18 and steering column shaft 16 will continue to extend as demonstrated by block 138 due to the unlatched status of the restraint 54 as determined by block 136. However, if the steering column shaft 16 and steering wheel 18 are at full extension to the driving position 22, as determined by block 142, then the ADAS system 98 will become inactive and the driver 46 will provide directional control, as demonstrated by block 144. Block 146 indicates an end of operation 100, however it should be understood that the operation 100 may be repeated at block 106 (FIG. 5A).

The transition period of extending the steering column shaft 16 and steering wheel 18 from the retracted position 20 to the driving position 22, or from an interim position to the driving position 22, is longer than a deployment time period for a driver's side air bag 42 should a crash occur. Further, deployment of the air bag 42 when the steering wheel 18 is retracted from the driving position 22 will place a rearward face of the bag 42 at a greater than optimal distance from the seated driver 46 such that the reduction of driver's kinetic energy will be diminished from that of the vehicle design intent. Thus, the steering column shaft 16 is further fitted with an interlock device 60, such as electrical signals from the position switches or potentiometers from the electrical device extension detection device 48 or from the steering column adjustment assembly 30, which may further be in communication with controller 102, to prevent air bag deployment in the event the steering column shaft 16 is not in the driving position 22. However, deployment of airbag 42 is allowed (airbag 42 is active) when the wheel 18 is in the driving position 22. Thus, the air bag 42 is non-deployable when the air bag 42 is inactive, such that the ability to deploy the air bag 42 is prohibited, and the air bag 42 is deployable when the airbag 42 is active, such that the ability to deploy the air bag 42 is enabled.

Figure 6A:
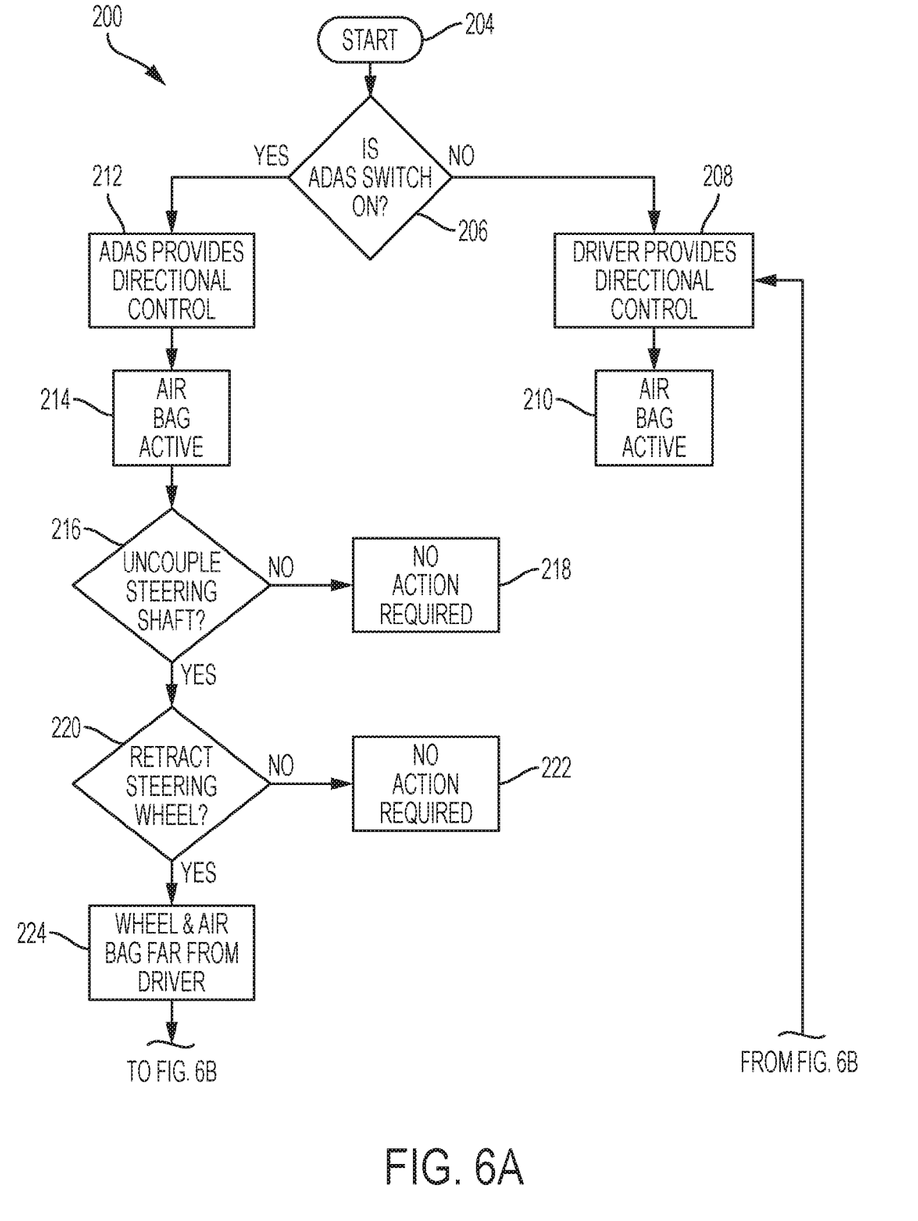
Figure 6B:
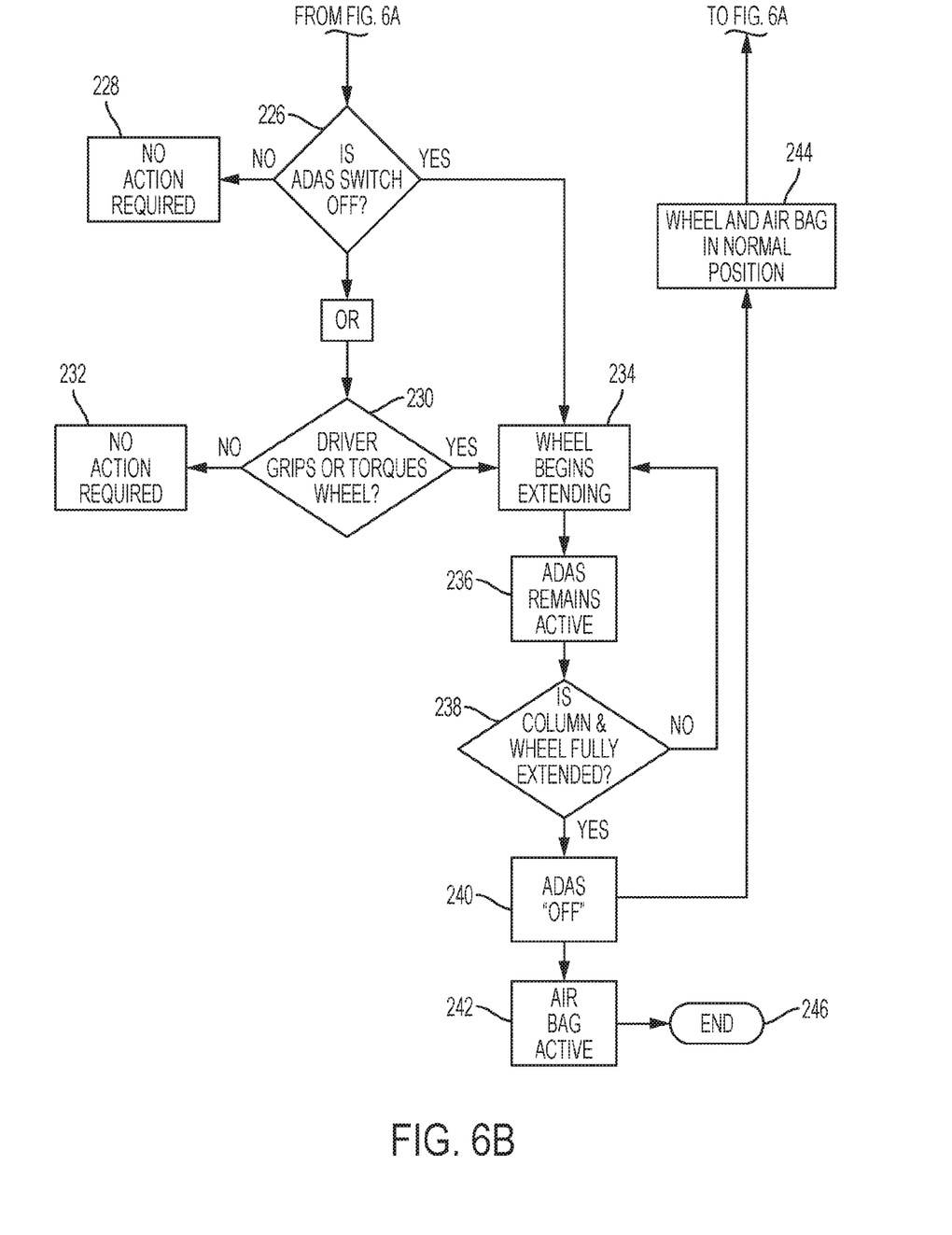

An operation 200 for the above-described system is described with respect to FIGS. 6A and 6B. A start 204 of the operation 200, as shown in FIG. 6A, may be assessed by a controller 102 of an ADAS system 98. The operation 200 will determine, as demonstrated by block 206 whether an ADAS switch of the ADAS system 98 is on. When the ADAS switch is not on, then, as demonstrated by block 208, a driver 46 may provide directional control, and the air bag 42 is active (deployable in a crash event), as demonstrated by block 210.

When the ADAS switch is on, then, as determined by block 206, the ADAS system 98 may provide directional control, as demonstrated by block 212. At this point, the air bag 42 is still active (deployable in a crash event), as demonstrated by block 214. The controller 102 further determines, as demonstrated by block 216, if the steering column shaft 16 has been decoupled yet, such as by decoupling assembly 32. If not, then as demonstrated by block 218, no action is required. However, if the steering column shaft 16 is decoupled, then as demonstrated by block 220, it will be further determined if the steering wheel 18 is retracted or being retracted. If not, then as demonstrated by block 222, no action is required. However, if the steering wheel 18 has been retracted, then as noted by block 224, the steering wheel 18 and thus the air bag 42 will be distanced from the driver 46 by a distance greater than a distance designed for optimal driver protection.

The operation 200 extends from block 224 in FIG. 6A to block 226 in FIG. 6B. With additional reference to FIG. 6B, it will further be determined if the ADAS switch is off, as demonstrated by block 226, or if the driver 46 grips or torques the wheel 18, as demonstrated by block 230. If the ADAS switch is not off and the driver 46 does not grip or torque the wheel 18, then as demonstrated by blocks 228 and 232, no action is required. However, if the ADAS switch is off and/or the driver 46 grips or torques the wheel 18, then the wheel 18 (and column shaft 16) begins extending as demonstrated by block 234. The ADAS system 98 remains active, as demonstrated by block 236, until it is further determined by block 238 if the column shaft 16 and wheel 18 are fully extended. If the column shaft 16 and wheel 18 are not fully extended to the driving position 22, then the wheel 18 and column shaft 16 continue to extend, as noted in block 234. However, if the column shaft 16 and wheel 18 are fully extended to the driving position 22, then the ADAS system 98 is turned off as noted in block 240, the air bag 42 becomes active (deployable in a crash event) as noted in block 242. Also, with the steering wheel 18 and the air bag 42 in the driving position 22 as noted in block 244, the driver 46 provides directional control as noted in block 208 (FIG. 6A). While block 246 indicates an end of the operation 200, the operation 200 will repeat with the determination of whether or not the ADAS switch is on, as demonstrated by block 206.

Thus, operations 100 and 200 ensure that the driver 46 is prohibited from retracting the steering column shaft 16 until the driver restraint 54 is secured, and the air bag 42 is operational when the steering wheel 18 is in the driving position 22. Either or both operations 100 and 200 may be used in the same vehicle 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column system comprising:
   a steering column shaft;
   a steering input device coupled to the steering column shaft;
   an air bag operatively arranged with the steering input device;
   a column adjustment assembly configured to translate the steering column shaft between a retracted position and a driving position;
   a first interlock configured to indicate when the steering column shaft is in the driving position and when the steering column shaft is in the retracted position; and
   when the steering column shaft is in the retracted position, the air bag is non-deployable, and when the steering column shaft is in the driving position, the air bag is deployable.

2. The steering column system of claim 1, further comprising a driver restraint and a second interlock, the second interlock configured to indicate whether the driver restraint is locked, wherein when the driver restraint is locked, the steering column shaft is retractable, and when the driver restraint is not locked, the steering column shaft is not retractable.

3. The steering column system of claim 2, wherein the driver restraint includes at least one of a seat belt and a shoulder harness.

4. The steering column system of claim 2, further comprising a locking portion configured to lock the driver restraint, wherein the second interlock is communicable with the locking portion.

5. A steering column system comprising:
   a steering column shaft;
   a steering input device coupled to the steering column shaft;
   a driver restraint;
   a column adjustment assembly configured to translate the steering column shaft between a retracted position and a driving position;
   a first interlock configured to indicate whether the driver restraint is locked; and
   when the driver restraint is locked, the steering column shaft is retractable, and when the driver restraint is not locked, the steering column shaft is not retractable.

6. The steering column system of claim 5, wherein, when the steering column shaft is in the retracted position and the first interlock indicates the driver restraint is not locked, the column adjustment assembly returns the steering column shaft to the driving position.

7. The steering column system of claim 5, further comprising an air bag operatively arranged with the steering input device.

8. The steering column system of claim 6, further comprising a second interlock, the second interlock configured to indicate when the steering column shaft is in the driving position and when the steering column shaft is in the retracted position, wherein, when the steering column shaft is in the retracted position, the air bag is non-deployable, and when the steering column shaft is in the driving position, the air bag is deployable.

9. The steering column system of claim 5, further comprising a decoupling assembly configured to decouple the steering input device from a steering gear.

10. The steering column system of claim 5, further comprising a torque interface assembly configured to detect a torque input into the steering input device.

11. The steering column system of claim 5, further comprising at least one sensor configured to monitor at least one of driver compartment conditions, a driver's condition, a vehicle environment, and a vehicle control system.

12. The steering column system of claim 5, wherein at least a portion of the steering input device is non-rotatable.

13. The steering column system of claim 12, further comprising a work surface coupled to or integrated with the steering input device.

14. A vehicle comprising a steering column system, the steering column system including:
  a steering column shaft;
  a steering input device coupled to the steering column shaft;
  an air bag operatively arranged with the steering input device;
  a driver restraint;
  a column adjustment assembly configured to translate the steering column shaft between a retracted position and a driving position;
  at least one of a first interlock and a second interlock, the first interlock configured to indicate whether the driver restraint is locked, the second interlock configured to indicate when the steering column shaft is in the driving position and when the steering column shaft is in the retracted position;
  when the steering column shaft is in the retracted position, the air bag is non-deployable, and when the steering column shaft is in the driving position, the air bag is deployable; and,
  when the driver restraint is locked, the steering column shaft is retractable, and when the driver restraint is not locked, the steering column shaft is not retractable.

15. The vehicle of claim 14, further comprising an autonomous driving assisted steering system having a controller, the controller configured to receive a signal from the at least one of the first interlock and the second interlock.

16. The vehicle of claim 14, further comprising an instrument panel including at least one receiving compartment configured to receive at least a portion of the steering column system when the steering column system is in the retracted position.

17. A method of operating a steering column system of a vehicle, the method comprising:
  providing a steering column shaft movable between a retracted position and a driving position;
  moving a driver restraint to one of a locked position and an unlocked position; and,
  translating a steering column shaft to the retracted position when the driver restraint is in the locked position, and prohibiting the steering column shaft from being in the retracted position when the driver restraint is in the unlocked position.

18. The method of claim 17, further comprising enabling an air bag when the steering column shaft is in the driving position, and disabling the air bag when the steering column shaft is in the retracted position.

19. The method of claim 17, wherein prohibiting the steering column shaft from being in the retracted position when the driver restraint is in the unlocked position includes either returning the steering column shaft from the retracted position to the driving position or blocking the steering column shaft from translating from the driving position to the retracted position.

* * * * *